March 25, 1952        W. B. RAY        2,590,463
ANTIGLARE ATTACHMENT FOR VEHICLES
Filed Nov. 9, 1948
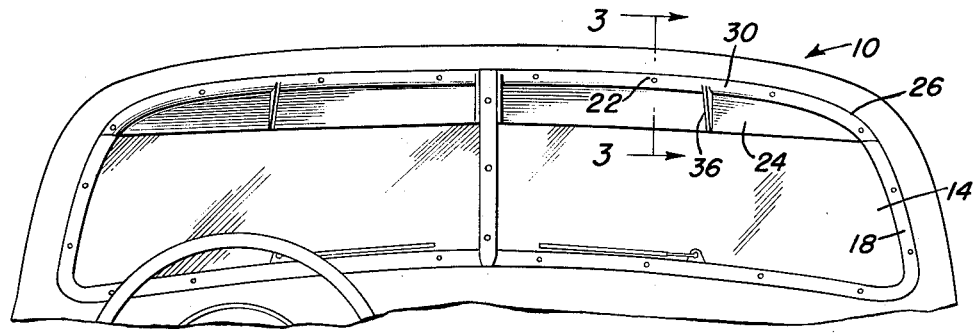
Fig. 1.
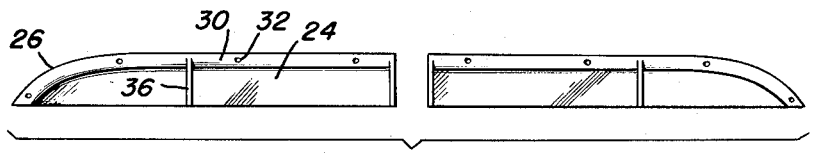
Fig. 2.
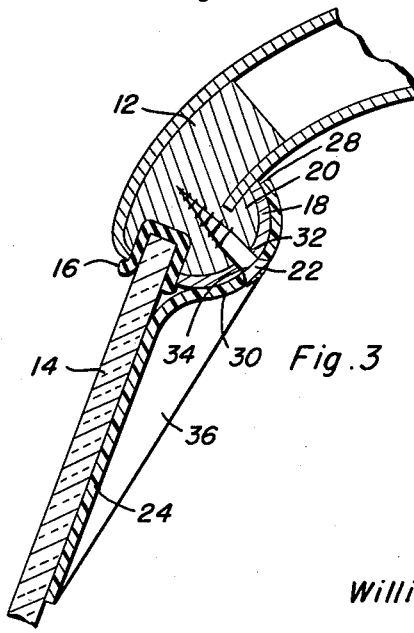
Inventor
William B. Ray
By *Clarence A. O'Brien and Harvey B. Jacobson*
Attorneys Patented Mar. 25, 1952

2,590,463

UNITED STATES PATENT OFFICE 2,590,463

ANTIGLARE ATTACHMENT FOR VEHICLES

William B. Ray, Pensacola, Fla.

Application November 9, 1948, Serial No. 59,086

6 Claims. (Cl. 296—97)

This invention relates to new and useful improvements in vision shields and the primary object of the present invention is to provide an attachment for vehicle windshields that will protect a driver's eyes against glare and the like.

Another important object of the present invention is to provide an anti-glare strip for vehicles so designed as to permit the same to be applied to a vehicle windshield and windshield frame in such a manner as to restrict glare into a driver's eyes without effecting the driver's visibility through the windshield.

A further object of the present invention is to provide an anti-glare attachment for vehicle windshields that is quickly and readily applied to or removed from a windshield in a convenient manner.

A still further aim of the present invention is to provide a device of the aforementioned character that is simple and practical in construction, strong and reliable in use, small and compact in structure, neat and attractve in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is an inside elevational view of a portion of a vehicle, and showing the present invention applied thereto;

Figure 2 is a group elevational view of the present invention; and,

Figure 3 is an enlarged vertical sectional view taken substantially on the plane of section line 3—3 of Figure 1.

Referring now to the drawings in detail, wherein for the purpose of illustration, there is disclosed a preferred embodiment of the present invention, the numeral 10 represents a vehicle windshield construction generally, including a pair of window frames 12 supporting the usual windshields or windows 14.

The window holding channels or sealing strips 16 are retained in position to the frames 12 by concavo-convexed retainer strips 18 that embrace convexed ribs 20 integrally formed with the frames 12 and are secured to the frames 12 by fasteners 22.

Many shields have been utilized in conjunction with the windows 14 heretofore such as sunvisors or Celluloid sheets held in position to the windows by hinges, pivots and in some instances suction cups. However, such means frequently obstructed the driver's vision and were difficult to apply to the windows.

The present invention is particularly constructed to reduce to a minimum the amount of glare passing through the windows 14 and at the same time permit a driver to observe the road in a safe manner. The same also utilizes the already present structure of the windshield construction to retain the cost of installation and service at a minimum.

To accomplish the desired results, there is provided an elongated substantially flat sheet of opaque material 24 such as color plastic or a similar relatively soft material that will not mar or scratch the window 14 against which the same is adapted to bear.

The outer end portion of the material 24 is rounded as at 26 to conform to the upper and outer corners of the windshield construction, it being understood that one of the present shields is to be applied to each window section of the windshield construction, the only difference in the same being the shape which is illustrated in Figure 2.

The upper edge 28 and rounded portion 26 of the material are pressed outwardly during the molding of the instant shield to provide channeled members or concavo-convexed strips 30 that conform to and which receive the upper retaining strips for the windshield construction.

The web of the strips 30 are provided with apertures 32 that register with the apertures 34 in the strips 18 and frames 12 that receive the fasteners 22, and the fasteners 22 extend through the apertures 32 to hold the present shield relative to the windshield construction and one face of the material 24 bears against the window 14.

In order to reinforce the material 24 and to prevent warping of the same, any suitable number of webs or ribs 36 are formed integrally with the material 24.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a vehicle windshield including a window frame and an inner convexed retainer strip; an anti-glare attachment comprising an elongated opaque strip bearing against the windshield the entire length of the windshield, a channeled member extending throughout the length of the strip and integrally formed with said strip and receiving the retainer strip, said channeled member extending throughout the length of said strip, and fasteners extending through said channeled member and said retainer strip.

2. The combination of claim 1 and reinforcing webs for said strip, said webs being joined with said member.

3. In combination with a divided windshield having a divider strip and a frame, of an anti-glare attachment comprising a pair of elongated flat members resting against the inner surface of the windshield at the upper portion of the windshield, said members having inner end portions abutting the divider strip, said members having upper edges, and channels at the upper edges of said members receiving said frame and secured to said frame to retain the members against the windshield and to prevent rattling of the members against the windshield.

4. In a windshield construction including a transparent window and a frame for the window having fasteners therein, the improvement of which comprises an elongated flat member resting against the upper portion of the window, and a channel strip carried by said member receiving the frame, said strip having openings therein for receiving said fasteners to hold the member against the window.

5. In a vehicle window shield construction including a window, a frame for the window, a window holding channel, said frame having a convexed rib disposed within the interior of the vehicle, a concavo-convexed retainer strip embracing said ribs and supporting said window holding channel, and fasteners securing said retainer strip to said rib; the improvement of which comprises, an elongated flat member resting against the inner surface of the window and at the upper portion of the window, and a channeled strip on said member receiving said retainer strip, said channeled strip having openings receiving said fasteners.

6. The combination of claim 5, wherein said frame includes a rounded upper and outer corner, said channeled strip having a curved end portion receiving the upper and outer corner of said frame.

WILLIAM B. RAY.

REFERENCES CITED

The following references are of record in the file of this patent:

UNITED STATES PATENTS

| Number | Name | Date |
| --- | --- | --- |
| 1,273,934 | Horton | July 30, 1918 |
| 1,332,225 | Machacek, Jr. | Mar. 2, 1920 |
| 1,593,187 | Mathis | July 20, 1926 |
| 1,692,543 | Bourgon | Nov. 20, 1928 |
| 1,827,299 | Pritchard | Oct. 13, 1931 |
| 2,477,680 | Young | Aug. 2, 1949 |